US011535077B2

(12) United States Patent
Faust et al.

(10) Patent No.: US 11,535,077 B2
(45) Date of Patent: Dec. 27, 2022

(54) AUTOMATIC AXLE LIFTING SYSTEM

(71) Applicants: Jim Faust, Ankeny, IA (US); Glen Vowell, Panora, IA (US)

(72) Inventors: Jim Faust, Ankeny, IA (US); Glen Vowell, Panora, IA (US)

(*) Notice: Subject to any disclaimer, the term of this patent is extended or adjusted under 35 U.S.C. 154(b) by 0 days.

(21) Appl. No.: 17/381,244

(22) Filed: Jul. 21, 2021

(65) Prior Publication Data

US 2022/0024274 A1 Jan. 27, 2022

Related U.S. Application Data

(60) Provisional application No. 63/054,291, filed on Jul. 21, 2020.

(51) Int. Cl.
*B60G 17/019* (2006.01)
(52) U.S. Cl.
CPC ........ *B60G 17/019* (2013.01); *B60G 2400/52* (2013.01)
(58) Field of Classification Search
CPC .............. B60G 17/019; B60G 2400/52; A01B 59/067; A01B 71/02; A01B 59/042; A01B 59/066
See application file for complete search history.

(56) References Cited

U.S. PATENT DOCUMENTS

| 2013/0306192 A1* | 11/2013 | Hennig ............. B60C 23/00336 141/4 |
| 2021/0016611 A1* | 1/2021 | Bechthold ......... B60C 23/00372 |
| 2022/0194361 A1* | 6/2022 | Laine ................. B60W 40/068 |

* cited by examiner

*Primary Examiner* — Toan C To
(74) *Attorney, Agent, or Firm* — Brennan, Manna & Diamond, LLC (57) ABSTRACT

The present invention relates to an automatic lift system for a pusher axle and/or a bridge axle of a truck. The automatic lift system raises the pusher axle and/or the bridge axle in the event of a tire blowout or low tire pressure to prevent the truck from swerving, spinning out or rolling over. The system includes a tire pressure sensor integrated to each of two wheels connected to the pusher axle and each of the two wheels connected to the bridge axle. Each tire pressure sensor is connected to a wired circuit and controller area network (CAN) of the truck for electronic communication with a control box. The control box receives tire pressure information from the sensors and transmits axle lift instructions in response to the tire pressure.

20 Claims, 7 Drawing Sheets

AUTOMATIC AXLE LIFTING SYSTEM

CROSS-REFERENCE TO RELATED APPLICATION

The present application claims priority to, and the benefit of, U.S. Provisional Application No. 63/054,291, which was filed on Jul. 21, 2020 and is incorporated herein by reference in its entirety.

FIELD OF THE INVENTION

The present invention relates generally to the field of heavy vehicles. More specifically, the present invention relates to a safety system for ready-mix rear discharge trucks or other similar vehicles having a bridge axle and/or pusher axle. The safety system uses a plurality of sensors to detect a tire blowout or loss of air pressure in one or more tires, and automatically raises the bridge or pusher axle in the event of a tire blowout or loss of tire pressure in order to prevent the truck from swerving, spinning out or rolling over. The safety system allows the drivers to keep control of the vehicle in tire blowout and similar events, thereby preventing accidents, injuries, and fatalities. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, heavy vehicles such as trucks are an important mode of transferring products/goods to their final destination. Generally, trucks such as ready-mix rear discharge trucks or the like include lift axles to improve fuel consumption, and reduce maintenance and tire wear. The axle behind the primary drive axle is known as a pusher axle, and the rearmost axle on the trailer is known as a tag/bridge axle. The axles such as the pusher axle and/or tag axle can be lifted or dropped as per the desires of the vehicle driver.

With the heavy vehicles, in case a ready-mix rear discharge truck experiences a tire blowout or loss of tire pressure, the driver is not typically able to maintain control, which causes the vehicle to often swerve off the roadway, cross into oncoming traffic or roll over. Tire blowout is a rapid, explosive loss of inflation pressure of a pneumatic tire that is caused when an object damages the structural components of the tire to the extent where the tire structure is incapable of containing the compressed air. This causes sudden escaping of air from the tires that leads to an imbalanced vehicle. In any of these scenarios, if the vehicle operator is unable to control and balance the vehicle, then this may result in serious injuries and fatalities can occur. Additionally, accidents in cases of tire blowout often result in a totaled vehicle.

Usually, the vehicle drivers are unable to determine in advance if tire blowout or loss of tire pressure is about to occur. If the driver gets to know in advance about the occurrence of these events, the driver may take some immediate actions to prevent swerving off the road or rolling over of the vehicles due to tire blowout or other similar events. However, currently there is no means to detect occurrences of tire blowout or low tire pressure in advance.

Therefore, there exists a long felt need in the art for a safety system for heavy vehicles that prevents any accidents due to tire blowout or loss of tire pressure. There is also a long felt need in the art for a safety system that can be easily integrated with conventional heavy trucks such as ready mix, concrete or rear discharge trucks. Additionally, there is a long felt need in the art for a vehicle safety system that ensures the monitoring of occurrences of tire blowout and other similar events, and ensures that proper action is taken in advance to prevent any consequences of tire blowout or loss of tire pressure. Moreover, there is a long felt need in the art for a safety system for heavy vehicles that ensures an immediate action is taken in case of tire blowout, to prevent the vehicle from swerving off the roadway, crossing onto oncoming traffic or rolling over. Further, there is a long felt need in the art for a safety system for vehicles that prevents serious injuries and fatalities due to tire blowout or loss of pressure events. Furthermore, there is a long felt need in the art for a safety system that is automatic, and does not require the vehicle operator to take any actions in case of tire blowout or other similar events. Finally, there is a long felt need in the art for a vehicle safety system that allows automatic lifting of axles to balance the vehicles in case of tire blowout and prevents vehicles from being damaged.

The subject matter disclosed and claimed herein, in one embodiment thereof, comprises a pusher axle and bridge master automatic lift system for trucks that is configured to raise the pusher axle and bridge master in the event of a tire blowout or low tire pressure in order to prevent the truck from swerving, spinning out or rolling over. The system comprises a tire pressure sensor integrated to each of two tires/wheels connected to the pusher axle and each of the two tires/wheels connected to the bridge master, and each of the tire pressure sensors is connected to a wired circuit and controller area network (CAN) of the truck to electronically communicate to a control box. The control box can be positioned in a cabin of the truck and is configured to receive tire pressure information from the sensors and transmit a pusher axle lift instruction in case the sensor of a tire/wheel connected to the pusher axle reports low tire pressure information. The controller can transmit a bridge master lift instruction in case the sensor of a tire/wheel connected to the bridge master reports low tire pressure information.

In this manner, the novel automatic axle lifting system of the present invention accomplishes all of the forgoing objectives, and provides a relatively safe, easy and convenient solution to prevent the vehicles from swerving off the roadway, crossing onto oncoming traffic, or rolling over in the event of tire blowout or catastrophic loss of tire pressure. The automatic axle lifting system of the present invention operates automatically and does not require the vehicle operators to take any actions. The system automatically detects events such as tire blowout, loss of tire pressure or other similar events, with the help of sensors integrated into the tires/wheels of the pusher and bridge axle, and triggers a controller to immediately lift the required pusher axle or bridge axle in order to prevent the vehicle from being imbalanced and causing injuries and deaths.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pusher axle and bridge master automatic lift system for trucks. The pusher axle and bridge master automatic lift system are configured to raise the pusher axle and bridge master in the event of a tire blowout to prevent the truck from swerving, spinning out or rolling over. The system further comprises a tire pressure sensor integrated to each of the two wheels connected to the pusher axle and each of the two wheels connected to the bridge master, each tire pressure sensor is connected to a wired circuit and controller area network (CAN) of the truck to electronically communicate to a control box. The control box can be positioned in the cabin of the truck and can be configured to receive tire pressure information. The sensors can transmit a pusher axle lift instruction in case the sensor of a tire/wheel connected to the pusher axle reports low tire pressure information. The sensors can transmit a bridge master lift instruction in case the sensor of a tire/wheel connected to the bridge master reports low tire pressure information.

In a further embodiment of the present invention, a pusher axle automatic lift system for ready mix, concrete, rear discharge trucks or any truck with a pusher axle is disclosed. The pusher axle automatic lift system is configured to raise the pusher axle in event of a tire blowout or catastrophic low tire pressure. The system includes a tire pressure sensor integrated to each of two tires/wheels connected to the pusher axle, each tire pressure sensor is connected to a wired circuit and controller area network (CAN) of the truck for electronic communication to a control box. The control box can be positioned in a cabin of the truck and can be configured to receive tire pressure information. The sensors can transmit a pusher axle lift instruction in case any sensor reports low tire pressure, or catastrophic loss of tire pressure.

In yet a further embodiment of the present invention, a bridge master automatic lift system for ready-mix rear discharge trucks or any truck with a bridge master is disclosed. The bridge master automatic lift system is configured to raise the bridge master in event of a tire blowout or low tire pressure. The system includes a tire pressure sensor integrated to each of two wheels connected to the bridge master, wherein each tire pressure sensor is connected to a wired circuit and controller area network (CAN) of the truck to communicate to a control box. The control box can be positioned in a cabin of the truck and is configured to receive tire pressure information from the sensors and transmit a bridge master lift instruction in case any sensor reports low tire pressure information.

In yet a further embodiment of the present invention, a system is designed to be integrated into the bridge axle and pusher axle. When tire sensors detect a loss of pressure or blowout, the system automatically raises the truck in the area such as the bridge master axle or pusher axle where the respective tire is flat. The system allows a driver to keep control of the vehicle, preventing accidents, injuries, and fatalities, and prevents the truck from swerving, spinning out or rolling over during a tire blowout or severe loss of tire pressure.

In yet a further embodiment of the present invention, a method for automatically raising a pusher axle and/or a bridge master axle of a truck in case of low tire pressure is described. The method includes initially measuring real-time tire pressure information by sensors integrated to the tires/wheels of the truck, receiving real-time tire pressure information from sensors to a control box, comparing the received tire pressure information with a predefined pressure information by the control box, and transmitting an axle lift instruction to the bridge master or pusher axle based on determining the position of the sensor whose tire pressure information is less than the predefined information.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a safety system for heavy vehicles that prevents any accidents due to tire blowout or loss of tire pressure. There is also a long felt need in the art for a safety system that can be easily integrated with conventional heavy trucks such as ready mix, concrete or rear discharge trucks. Additionally, there is a long felt need in the art for a vehicle safety system that ensures the monitoring of occurrences of tire blowout and other similar events, and ensures a proper action is taken in advance to prevent any consequences of tire blowout or loss of tire pressure. Moreover, there is a long felt need in the art for a safety system for heavy vehicles that ensures an immediate action is taken in case of tire blowout, to prevent the vehicle from swerving off the roadway, crossing onto oncoming traffic, or rolling over. Further, there is a long felt need in the art for a safety system for vehicles that prevents serious injuries and fatalities due to tire blowout or loss of pressure events. Furthermore, there is a long felt need in the art for a safety system that is automatic and does not require the vehicle operator to take any actions in case of tire blowout or other similar events. Finally, there is a long felt need in the art for a vehicle safety system that allows the automatic lifting of axles to balance the vehicles in case of tire blowout and prevents the vehicle from being damaged.

The present invention, in one exemplary embodiment, is a novel automatic axle lifting system for trucks. The automatic axle lifting system is configured to raise a pusher axle and/or a bridge master axle in the event of a tire blowout or other similar conditions, to prevent the truck from swerving off of the road, spinning out, or rolling over, thereby preventing injuries. The system comprises a tire pressure sensor attached to each of the tires/wheels of the pusher axle and/or bridge master axle for determining the pressure of the corresponding wheels. Each of the sensors are connected to a control box positioned in vehicle's cabin through a wired circuit, that allows the sensors to transmit pressure-related information to the control box. The control box compares the received pressure information to a pre-set threshold value, and accordingly transmits a pusher axle lift instruction in case the sensor of a wheel connected to the pusher axle reports low tire pressure information or transmits a bridge master lift instruction in case the sensor of a wheel connected to the bridge master reports low tire pressure information.

Figure 1:
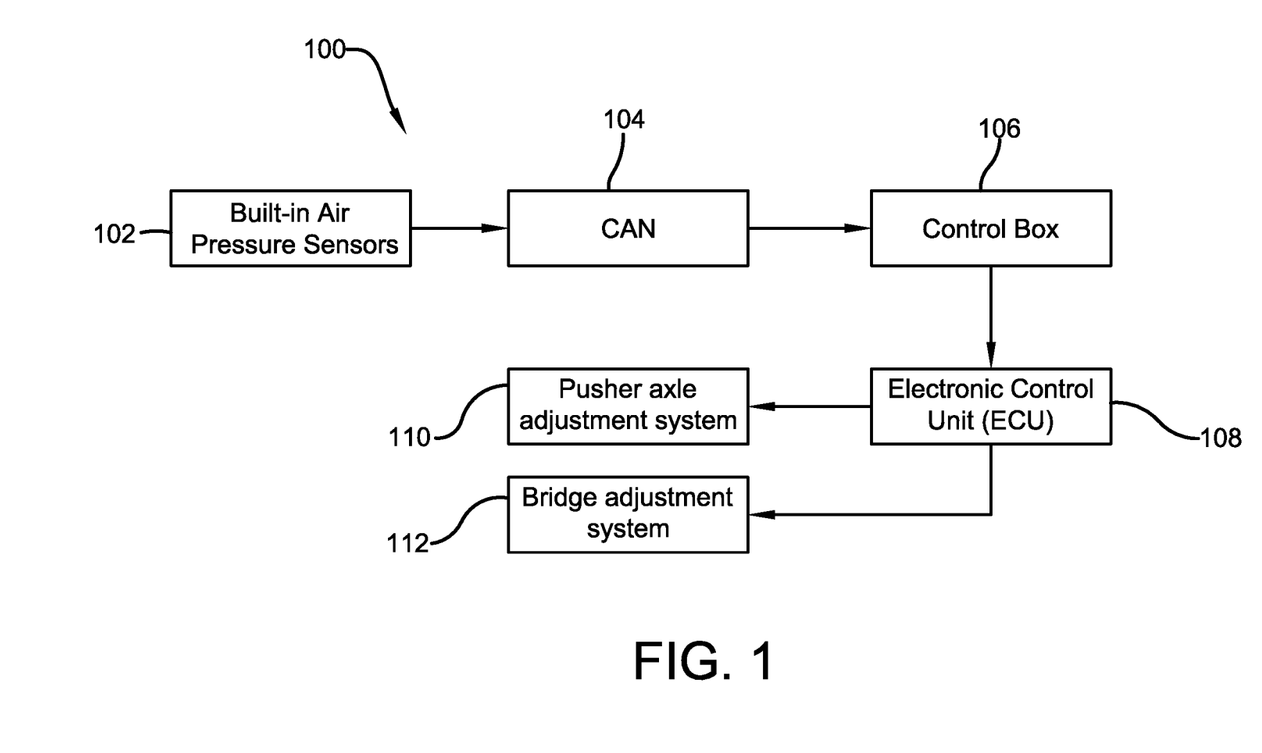
FIG. 1 illustrates a block diagram showing connection of control box with individual wheel sensors for lifting the pusher axle and the tag axle of a vehicle in accordance with the disclosed architecture.

Referring initially to the drawings, FIG. 1 illustrates a block diagram of one potential embodiment of a pusher axle and/or tag axle automatic lifting system of the present invention in accordance with the disclosed architecture. The pusher axle and tag axle automatic lifting system 100 of the present invention is configured for automatically raising the pusher axle and/or bridge/tag axle of a truck, such as a ready-mix rear discharge or concrete truck, in the event of a tire blowout or significant loss of air pressure in associated wheels. The automatic lifting system 100 automatically raises the pusher axle and/or bridge/tag axle where integrated sensors in the tire/wheel detect low air pressure, thus enabling the driver to maintain control of the truck/vehicle and also prevent the truck from swerving.

The axle lifting system 100 includes a plurality of sensors 102 integrated to the tires/wheels supported by the pusher axle and the tag axle of the truck. Each tire/wheel has an integrated sensor that is configured to monitor air pressure in a respective wheel and reports air pressure information to a control box 106. Individual sensors are shown in further figures of the disclosure. The control box 106 can be positioned in the cabin of the truck allowing a driver to regularly check the air pressure. The control box 106 is connected to the controller area network (CAN) 104, thereby allowing the system 100 to integrate to the existing wiring and circuitry of the truck or vehicle. The control box 106 based on the received air pressure transmits an instruction signal through the lifting system electronic control unit (ECU) 108 to a pusher axle adjustment system 110 and/or a bridge/tag axle adjustment system 112 to lift the corresponding wheels to provide safety and balance to the vehicle.

As known in the art, a tag axle is located behind the drive axles to take some of the weight off the rear drive axles when the vehicle/truck is fully loaded, and a pusher axle is positioned in front of the drive axles for adding stability to the chassis during cornering and load balancing of the vehicle. The lifting system 100 automatically lifts the tag axle using the bridge/tag axle adjustment system 112 or the pusher axle using the pusher axle adjustment system 110, in case low air pressure or tire blowout is detected in any of the tires/wheels of the pusher/tag axle.

The axle lifting system 100 provides increased performance by the other axles, resulting in less wear and tear on the vehicle's tires and ancillary components. The system 100 automatically lifts the axles without driver intervention, leading to operational efficiency and security of the vehicle and the driver. The tag axle 206 and the pusher axle 210 can be controlled and lifted separately based on the respective air pressure detected by corresponding integrated sensors of tires/wheels. Each wheel-pressure sensor is a small programmable electronic device and is located in the pressurized pocket of the wheel, and constantly measures the air pressure inside the wheel. The sensor transmits the information using CAN or via a low-frequency radio to the control box 106.

Figure 2:
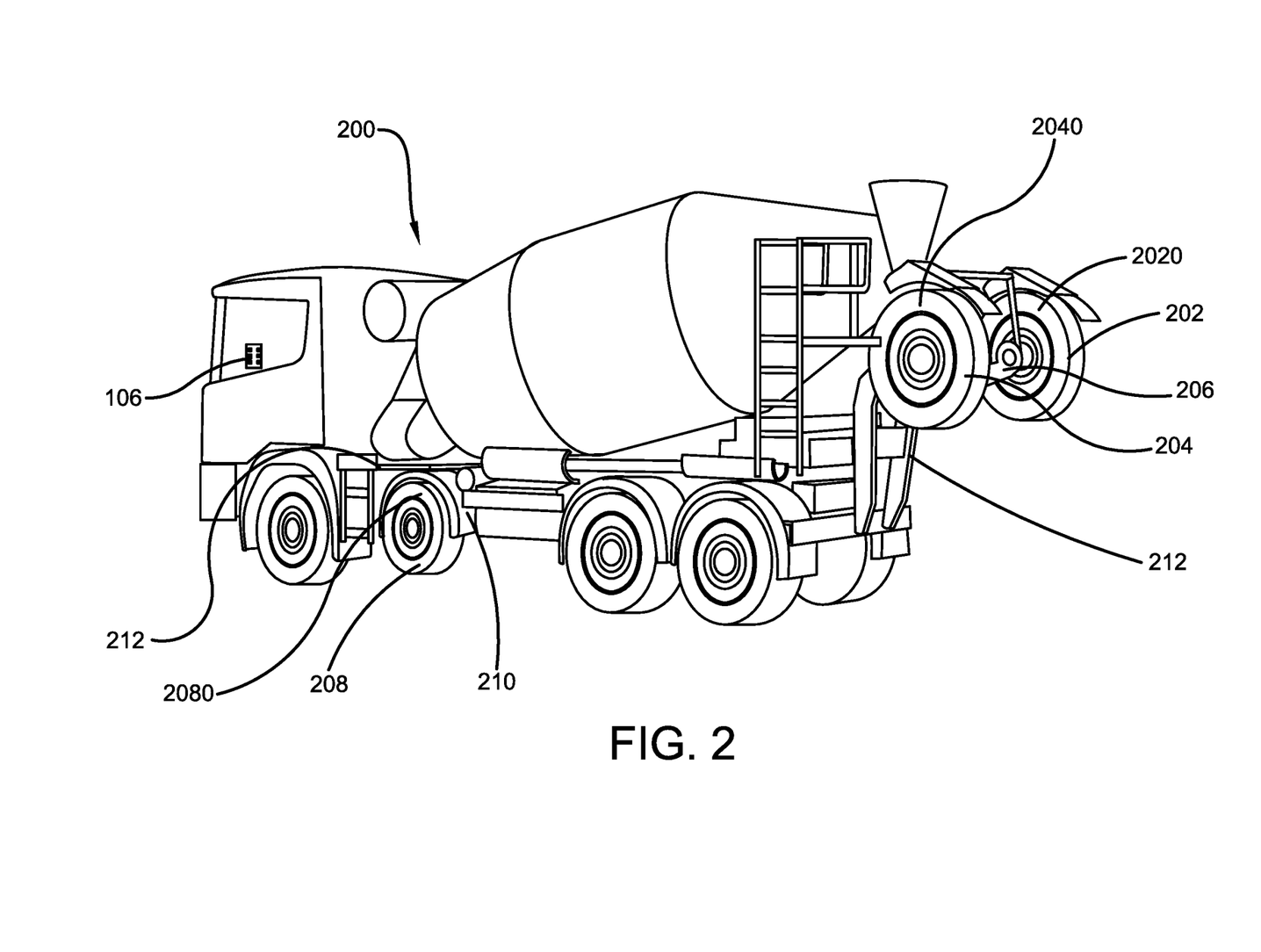
FIG. 2 illustrates a perspective view of one potential embodiment of pusher axle and tag axle automatic lifting system of the present invention in accordance with the disclosed architecture.

FIG. 2 illustrates a perspective view of one potential embodiment of the invention showing connection of a control box with individual wheel sensors for lifting the pusher axle and the tag axle of a vehicle in accordance with the disclosed architecture. A right bridge axle wheel 202 and a left bridge axle wheel 204 are connected to a liftable bridge or tag axle 206. The right bridge axle wheel 202 has an integrated tire pressure sensor 2020, and the left bridge axle wheel 204 has a corresponding integrated tire pressure sensor 2040. Similarly, a right pusher axle wheel (not shown) and a left pusher axle wheel 208 are connected to a pusher axle 210. The pusher axle wheels have corresponding integrated tire pressure monitoring sensors such as 2080.

Each pressure monitoring sensor integrated to the wheels are connected to an internal wiring circuit 212 and CAN (of FIG. 1) of the truck 200. Using the wiring circuit 212 and the CAN, the sensors 2020, 2040, 2080 and the integrated sensor of the right pusher axle wheel are communicably-connected to the control box 106 positioned in a cabin of the truck 200 or at any other convenient location.

It should be noted that the both the pusher axle 210 and the tag/bridge axle 206 can be automatically lifted when any of the sensors of a corresponding wheel report low pressure information to the control box 106. The control box 106 can monitor operating parameters including wheel or tire pressure, and the information can be used to make decisions about vehicle configuration: for example, to determine when to cause or permit liftable axles to be lifted or lowered. The axles (both bridge and pusher) can be made to operate automatically or autonomously (i.e. independently of operator control).

Figure 3:
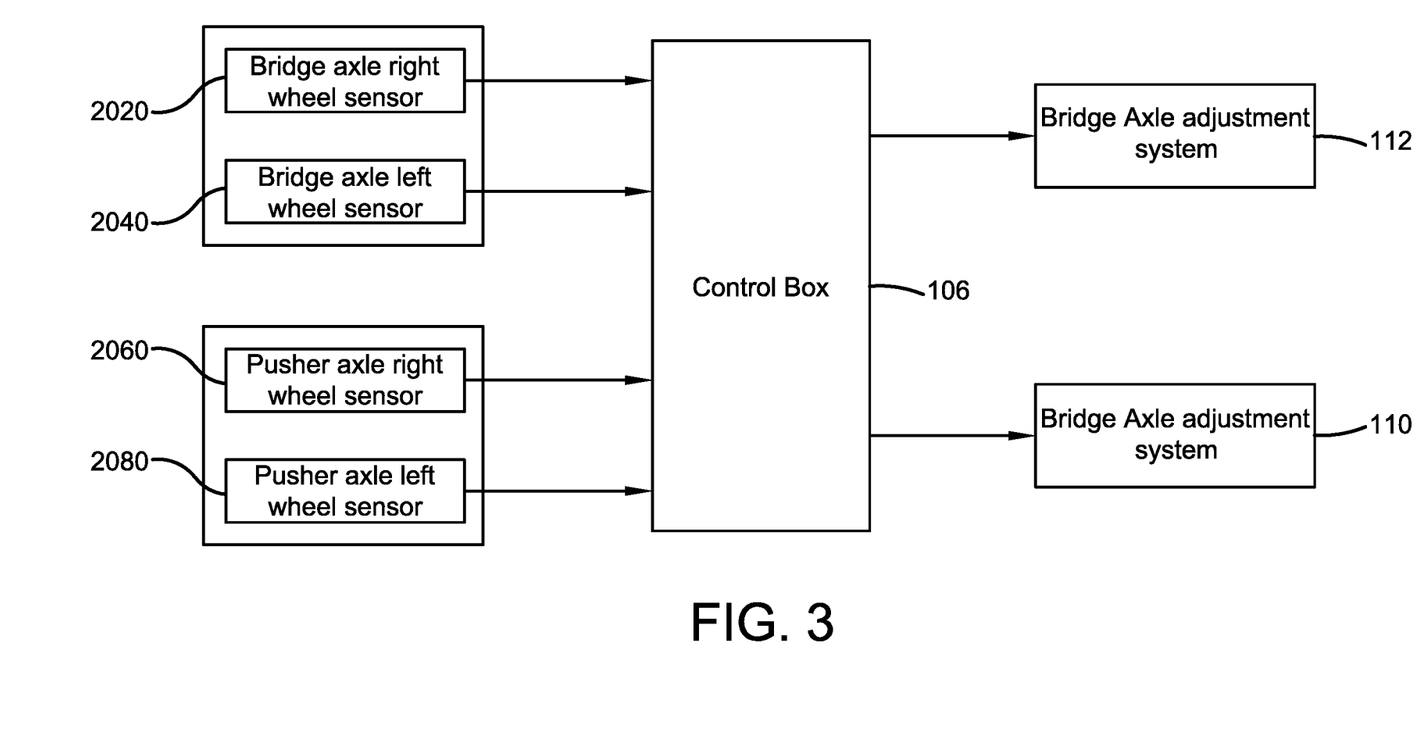
FIG. 3 illustrates a schematic view showing signals adjusting pusher axle and bridge axle using pusher axle and tag axle automatic lifting system of the present invention in accordance with the disclosed architecture.

FIG. 3 illustrates a schematic view showing signals adjusting the pusher axle and bridge/tag axle using the pusher axle and bridge/tag axle automatic lifting system of the present invention in accordance with the disclosed architecture. The control box 106 receives wheel/tire pressure from the four integrated sensors 2020, 2040, 2060, 2080 in real-time. Each sensor is integrated to the wheels connected to the pusher axle and the bridge master axle of the vehicle. As shown, the control box 106 receives real-time tire pressure information from the bridge axle right wheel Sensor 2020, the bridge axle left wheel sensor 2040, the pusher axle right wheel sensor 2060 and the pusher axle left wheel sensor 2080. In the present embodiment, the sensors 2020, 2040, 2060, 2080 start transmitting information when the ignition of the truck/vehicle is activated. Based on the received pressure information from the sensors 2020, 2040, 2060, 2080, the control box 106 transmits axle lifting commands to the bridge axle adjustment system 112 that is coupled with the bridge axle and pusher axle adjustment system 110 that is coupled to the pusher axle.

Figure 4:
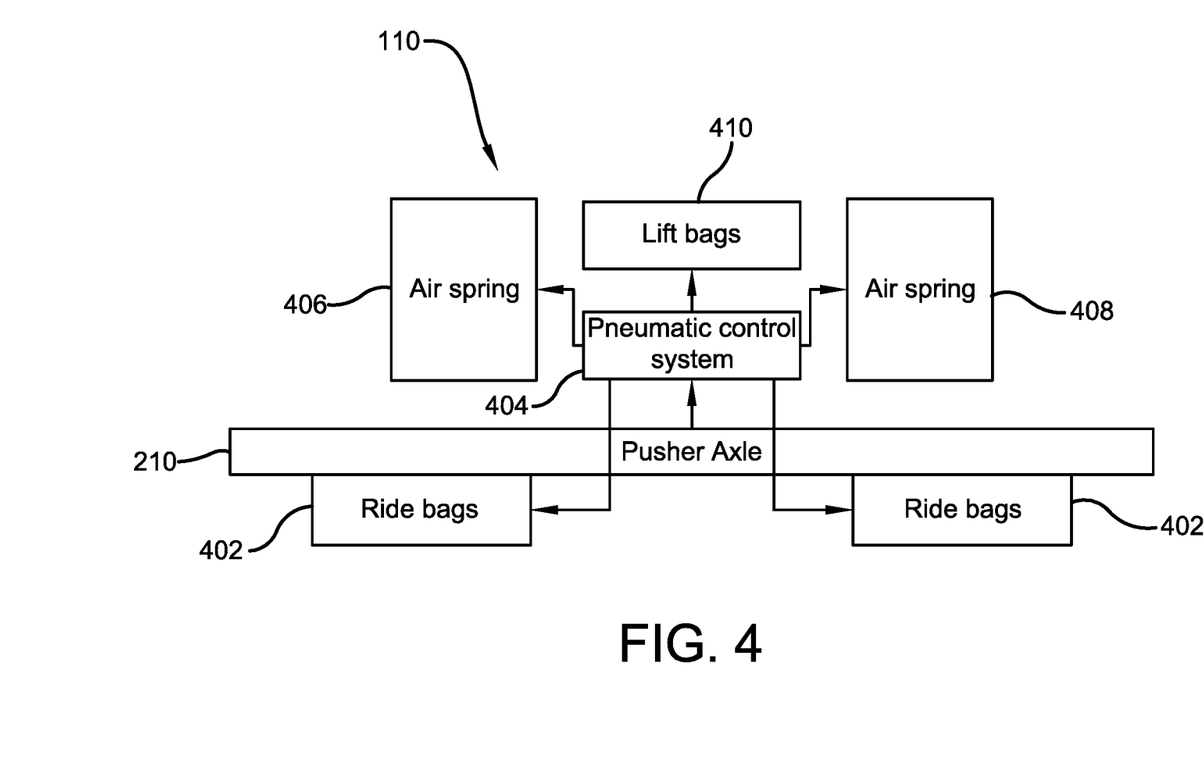
FIG. 4 illustrates a block diagram showing one potential embodiment of axle adjustment system of the present invention used for adjusting pusher and bridge axles in accordance with the disclosed architecture.

FIG. 4 illustrates a block diagram showing one potential embodiment of axle adjustment system of the present invention used for adjusting pusher and bridge axles in accordance with the disclosed architecture. As stated earlier, pusher axle adjustment system 110 is coupled to the pusher axle 210 and the bridge axle adjustment system 112 is coupled to the bridge axle 206. The present embodiment shows axle lift architecture for the pusher axle 210, however, the same mechanism can be used for lifting the bridge/tag axle 206.

The axle adjustment/lifting system has a plurality of ride bags 402 controlled by a pneumatic control system 404. The ride bags 402 are positioned under the pusher axle 210. A couple of air springs 406, 408 are connected to the pneumatic system 404 and are configured to inflate to lift the pusher axle 210. An additional lift bag 410 provides additional support to lift the pusher axle and the connected wheels. The pneumatic system 404 of the axle lifting system 110 can be automatically or autonomously activated on receiving a lifting instruction from the control box based on the low air pressure of the wheels/tires. The bridge axle can be set at certain pressures depending on the load size so that the user can scale, and not be overweight per applicable laws, rules and regulations.

Figure 5:
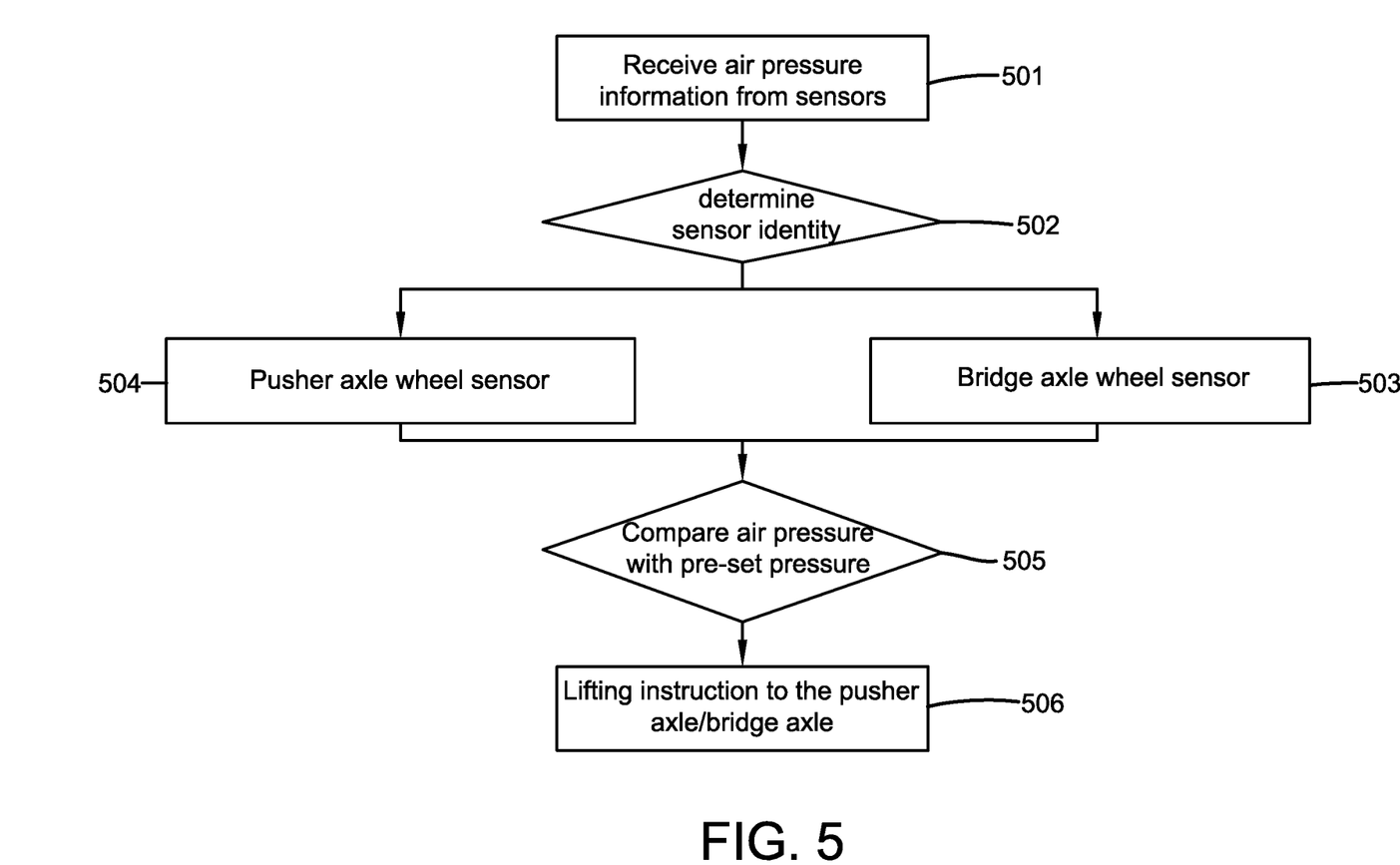
FIG. 5 illustrates a flow diagram showing steps and conditions for axle lifting system of the present invention for lifting pusher axle and bridge axle in accordance with the disclosed architecture.

FIG. 5 illustrates a flow diagram showing steps and conditions for the axle lifting system of the present invention for lifting pusher axle and/or bridge axle in accordance with the disclosed architecture. Initially, the control box positioned in the cabin of a truck or a vehicle and communicably coupled, or electronically paired, to tire pressure sensors integrated to the wheels receives tire air pressure information from the sensors (Step 501). Along with the tire pressure information, the identity of the sensor is also transmitted allowing the control box to determine and uniquely identify the sensor and position of the sensor, i.e. if the sensor is located at the pusher axle wheels or bridge master wheels (Step 502). The control box, or controller, determines that the sensor is a pusher axle sensor (Step 503) or a bridge axle sensor (Step 504). Based on the sensor position, the tire pressure information is compared with a predefined/preset wheel pressure value (Step 505). Accordingly, the control box provides an instruction to lift the pusher axle and/or bridge axle for automatically raising a bridge master axle or pusher axle in the event of a tire blowout or significant loss of air pressure. This ensures that the driver is able to maintain control of the truck.

In an embodiment of the present invention, the step of comparing the tire pressure information with a predefined/preset wheel pressure value (Step 505) can be performed before performing the step of determining the sensor identity (Step 502), while the other steps remain in similar sequence as discussed above.

Figure 6:
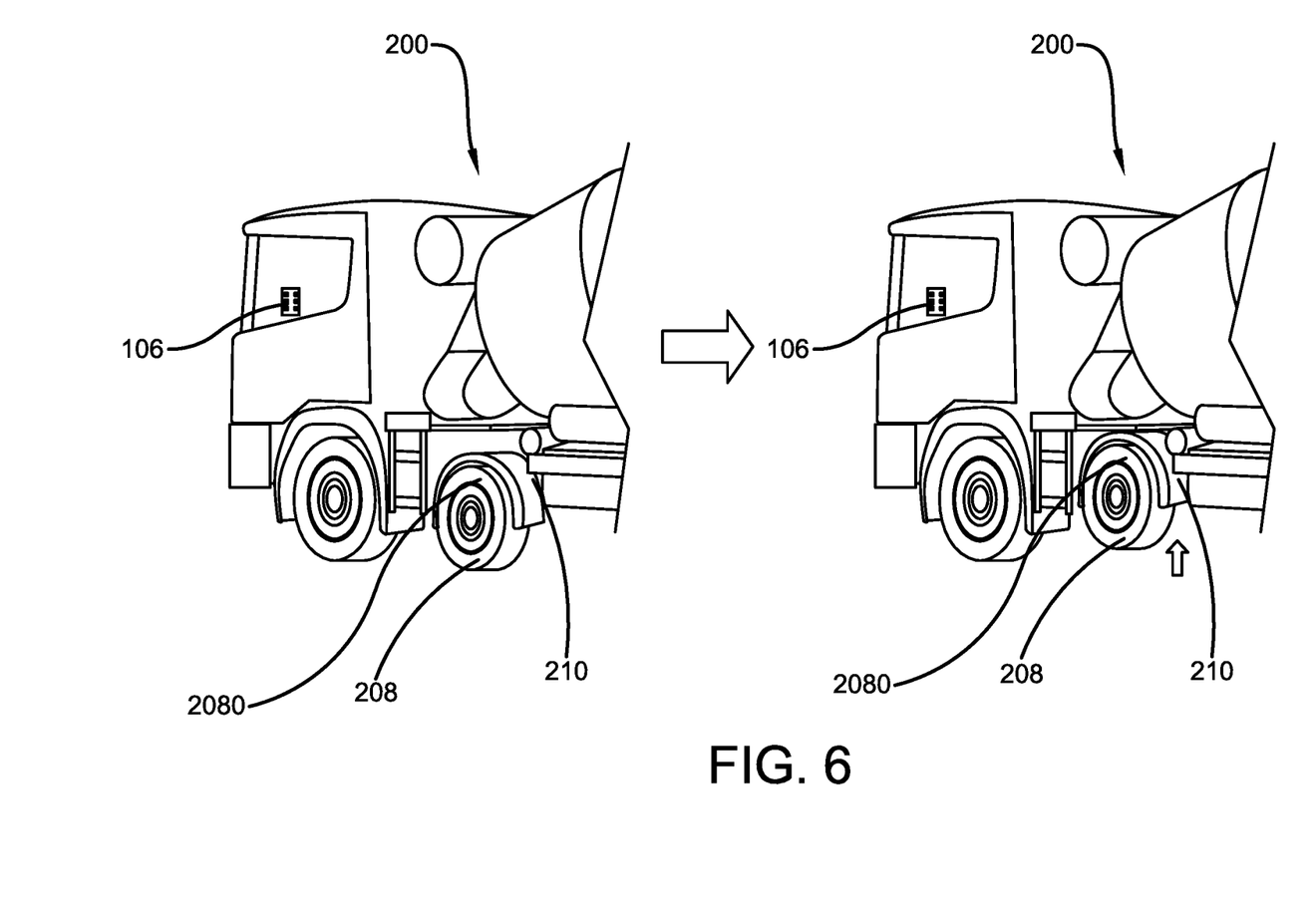
FIG. 6 illustrates a perspective view showing a tire lifted from the road by lifting the pusher axle by the axle lifting system of the present invention before loss of control of the truck in accordance with the disclosed architecture.

FIG. 6 illustrates a perspective view showing the tire lifted from the road by lifting the pusher axle by the axle lifting system of the present invention before loss of control of the truck in accordance with the disclosed architecture. When the tire pressure of the tire 208 sensed by the tire pressure monitoring sensor 2080 is below a predetermined threshold value, the control box, or controller, 106 provides an instruction to the pusher axle lifting system (not shown) to lift the pusher axle 210 to lift the wheel 208 to a height 602 thereby enabling a driver to maintain control of the truck 200 and prevent the truck from swerving, spinning out or rolling over during a tire blowout or loss of pressure. The wheel sensor is wired to the pusher to ensure an immediate reaction time.

Figure 7:
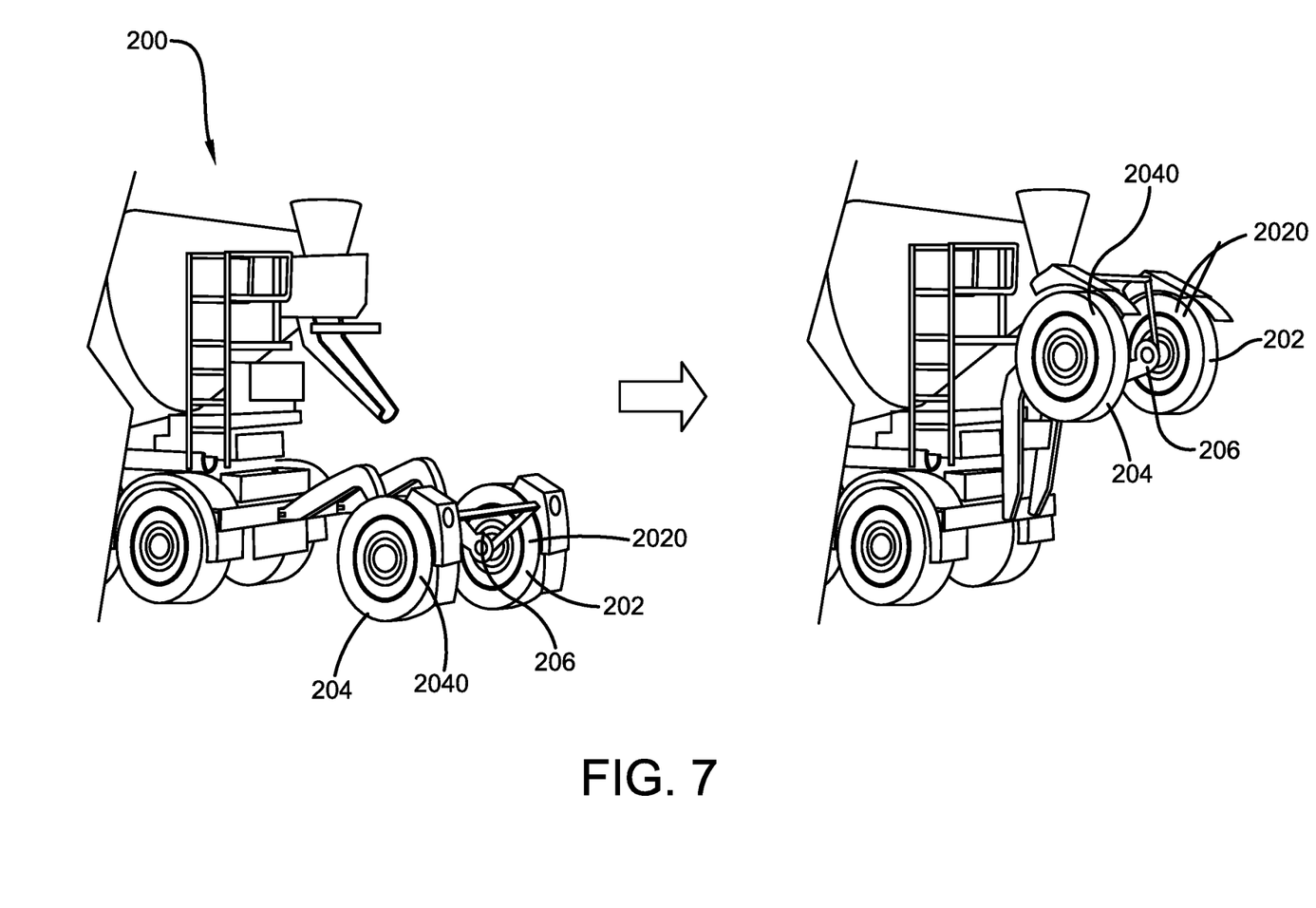
FIG. 7 illustrates a perspective view showing tire lifted from the road by lifting bridge master axle by the axle lifting system of the present invention before loss of control of the truck accordance with the disclosed architecture.

FIG. 7 illustrates a perspective view showing the tire lifted from the road by lifting the bridge master axle by the axle lifting system of the present invention before loss of control of the truck in accordance with the disclosed architecture. When the tire pressure of the tire 204, 202 sensed by the respective tire pressure monitoring sensor 2040, 2020 is below a predetermined threshold value, the control box, or controller, provides an instruction to lift the bridge master 206 to lift the wheels 204, 202 allowing a driver to maintain control of the truck 200 and prevents the truck from swerving, spinning out or rolling over, during a tire blowout or significant loss of tire pressure. The wheel sensor is wired to the bridge master to ensure an immediate reaction time.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "pusher axle and tag axle automatic lifting system", "automatic lifting system", "axle lifting system", "lifting system", and "system", are interchangeable and refer to the pusher axle and tag axle automatic lifting system 100 of the present invention.

Notwithstanding the forgoing, the pusher axle and tag axle automatic lifting system 100 of the present invention can be of any suitable size and configuration as is known in the art without affecting the overall concept of the invention, provided that it accomplishes the above-stated objectives. One of ordinary skill in the art will appreciate that the size, configuration, and material of the pusher axle and tag axle automatic lifting system 100 as shown in the FIGS. are for illustrative purposes only, and that many other sizes and shapes of the pusher axle and tag axle automatic lifting system 100 are well within the scope of the present disclosure. Although the dimensions of the pusher axle and tag axle automatic lifting system 100 are important design parameters for user convenience, the pusher axle and tag axle automatic lifting system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle axle automatic lifting system comprising:
a plurality of sensors integrated to the tires of a pusher axle;
said plurality of sensors includes a first sensor and a second sensor;
said first sensor monitors a first tire pressure of said pusher axle;
said second sensor monitors a second tire pressure of said pusher axle;
said first sensor and said second sensor report said first tire pressure and said second tire pressure to a controller;
said controller compares said first tire pressure and said second tire pressure to a predetermined pressure; and
said controller transmits an instruction signal to a lifting system electronic control unit of a pusher axle adjustment system to lift said pusher axle if said first tire pressure or said second tire pressure is less than said predetermined pressure.

2. The vehicle axle automatic lifting system of claim 1, wherein said lifting said pusher axle lifts said first tire and said second tire off of a ground surface.

3. The vehicle axle automatic lifting system of claim 2, wherein said controller transmitting said instruction signal is autonomous.

4. The vehicle axle automatic lifting system of claim 3, wherein said plurality of sensors includes a third sensor and a fourth sensor, and further wherein the third sensor monitors a third tire pressure of a tag axle and the fourth sensor monitors a fourth tire pressure of said tag axle.

5. The vehicle axle automatic lifting system of claim 4, wherein said third sensor and said fourth sensor report send said third tire pressure and said fourth tire pressure to said controller, said controller compares said third tire pressure and said fourth tire pressure to a predetermined pressure and said controller transmits an instruction signal to a lifting system electronic control unit of a tag axle adjustment system to lift said tag axle if said third tire pressure or said fourth tire pressure is less than said predetermined pressure.

6. The vehicle axle automatic lifting system of claim 5, wherein said lifting said tag axle lifts said third tire and said fourth tire off of the ground surface.

7. A vehicle safety system comprising:
a plurality of sensors integrated to the tires of a pusher axle;
said plurality of sensors includes a first sensor and a second sensor;
said first sensor monitors a first tire pressure of said pusher axle;
said second sensor monitors a second tire pressure of said pusher axle;
said first sensor and said second sensor report said first tire pressure and said second tire pressure to a controller;
said controller compares said first tire pressure and said second tire pressure to a predetermined pressure;
said controller transmits an instruction signal to a lifting system electronic control unit of a pusher axle adjustment system to lift said pusher axle if said first tire pressure or said second tire pressure is less than said predetermined pressure;
said plurality of sensors includes a third sensor and a fourth sensor;
said third sensor monitors a third tire pressure of a tag axle;
said fourth sensor monitors a fourth tire pressure of said tag axle;
said third sensor and said fourth sensor report said third tire pressure and said fourth tire pressure to said controller;
said controller compares said third tire pressure and said fourth tire pressure to a predetermined pressure; and
said controller transmits an instruction signal to a lifting system electronic control unit of a tag axle adjustment system to lift said tag axle if said third tire pressure or said fourth tire pressure is less than said predetermined pressure.

8. The vehicle safety system of claim 7, wherein said lifting said pusher axle lifts said first tire and said second tire off of a ground surface.

9. The lifting system of claim 8, wherein said lifting said tag axle lifts said third tire and said fourth tire off of the ground surface.

10. The lifting system of claim 7, wherein said controller transmitting said instruction signal is autonomous.

11. A method for automatically stabilizing a truck, the method comprising the steps of:
integrating a plurality of sensors to the tires of a pusher axle wherein said plurality of sensors includes a first sensor and a second sensor;
monitoring a first tire pressure of said pusher axle with said first sensor;
monitoring a second tire pressure of said pusher axle with said second sensor;
reporting said first tire pressure and said second tire pressure to a controller;
comparing said first tire pressure and said second tire pressure to a predetermined pressure; and
transmitting an instruction signal to a lifting system electronic control unit of a pusher axle adjustment system to lift said pusher axle if said first tire pressure or said second tire pressure is less than said predetermined pressure.

12. The method of claim 11, further comprising the steps of:
integrating a plurality of sensors to the tires of a tag axle wherein said plurality of sensors includes a third sensor and a fourth sensor;
monitoring a third tire pressure of said tag axle with said third sensor;
monitoring a fourth tire pressure of said tag axle with said fourth sensor;
reporting said third tire pressure and said fourth tire pressure to said controller;
comparing said third tire pressure and said fourth tire pressure to a predetermined pressure; and transmitting an instruction signal to a lifting system electronic control unit of a tag axle adjustment system to lift said tag axle if said third tire pressure or said fourth tire pressure is less than said predetermined pressure.

13. The method of claim 11, wherein said monitoring said first tire pressure and said second tire pressure is in real time.

14. The method of claim 13, wherein said monitoring said third tire pressure and said fourth tire pressure is in real time.

15. The method of claim 11, wherein said vehicle is a concrete truck.

16. The method of claim 12, wherein said lifting said pusher axle and said tag axle is autonomous.

17. The method of claim 12, wherein said lifting said pusher axle lifts said first tire and said second tire off of a ground surface.

18. The method of claim 17, wherein said lifting said tag axle lifts said third tire and said fourth tire off of the ground surface.

19. The method of claim 12, wherein said lifting said pusher axle and said tag axle is automatic.

20. The method of claim 12, wherein said monitoring said first tire pressure, said second tire pressure, said third tire pressure, and said fourth tire pressure further includes detecting a catastrophic loss to said first tire pressure, said second tire pressure, said third pressure, or said fourth tire pressure.

* * * * *